US005627763A

United States Patent [19]

Carlson

[11] Patent Number: 5,627,763

[45] Date of Patent: May 6, 1997

[54] SYSTEM AND METHOD FOR CONSTRUCTION GUIDANCE AND CONTROL

[76] Inventor: LeWayne P. Carlson, 5 Tecoma Cir., Littleton, Colo. 80127

[21] Appl. No.: 364,752

[22] Filed: Dec. 27, 1994

[51] Int. Cl.[6] .............................. G06F 19/00; G01B 5/14

[52] U.S. Cl. .................... 364/512; 364/146; 364/474.09; 395/500; 33/494; 33/758

[58] Field of Search ............................ 395/500; 364/512, 364/146, 191, 474.09, 709.09, 401, 474.02, 474.22, 474.24, 474.25, 474.26; 33/758, 563, 759, 474

[56] References Cited

U.S. PATENT DOCUMENTS

| | | | |
|---|---|---|---|
| 3,757,422 | 9/1973 | Frydenberg | 33/430 |
| 4,149,320 | 4/1979 | Troyer et al. | 33/758 |
| 4,367,590 | 1/1983 | Winter et al. | 33/758 |
| 4,554,635 | 11/1985 | Levine | 364/474.25 |
| 4,707,212 | 11/1987 | Hailey et al. | 156/361 |
| 4,845,858 | 7/1989 | Thomas | 33/759 |
| 5,046,015 | 9/1991 | Dasher et al. | 364/474.09 |
| 5,107,601 | 4/1992 | Semchuck | 33/759 |
| 5,253,334 | 10/1993 | Kimura et al. | 395/102 |
| 5,492,420 | 2/1996 | Nunokawa et al. | 400/62 |
| 5,494,360 | 2/1996 | Watanabe et al. | 400/83 |

*Primary Examiner*—Kevin J. Teska
*Assistant Examiner*—Tan Nguyen
*Attorney, Agent, or Firm*—Charles C. Corbin

[57] ABSTRACT

A system, method and apparatus for controlling, managing and facilitating the process of fabricating and/or constructing a useful physical entity such as a building, the invention involving the computer generation of a construction guidance and control tape for use by the primary hands-on fabricators, the invention including determining the control/fabrication tasks required according to the relevant plans and specifications, and the sequence by which such tasks are to be performed Then, information including the identification and description of component parts and their relative assembled locations and orientations is input to a computer controlled by a computer program in conjunction with a printer that will print out a plurality of elongate construction guidance and control tapes of predetermined lengths, one side of each tape providing a surface upon which indicia and information can be printed including showing where in the work environment the tape is to be attached, the beginning end of the tape, and how it is to be oriented, the location of component parts relative to each other, and their identification and description.

8 Claims, 4 Drawing Sheets

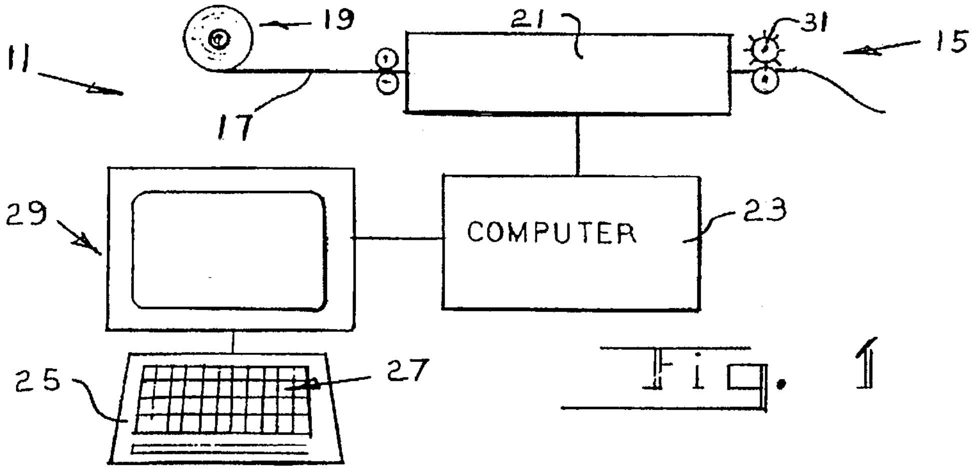
Fig. 1
Fig. 2
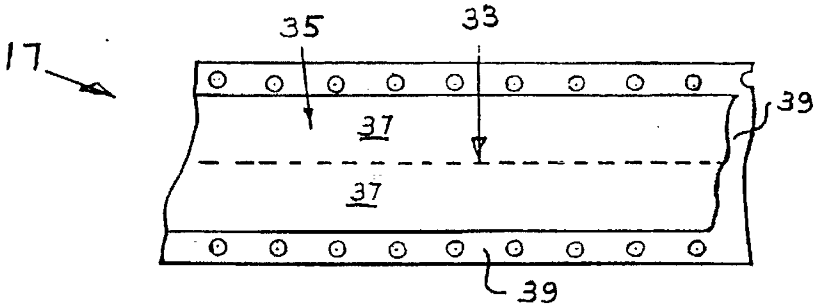
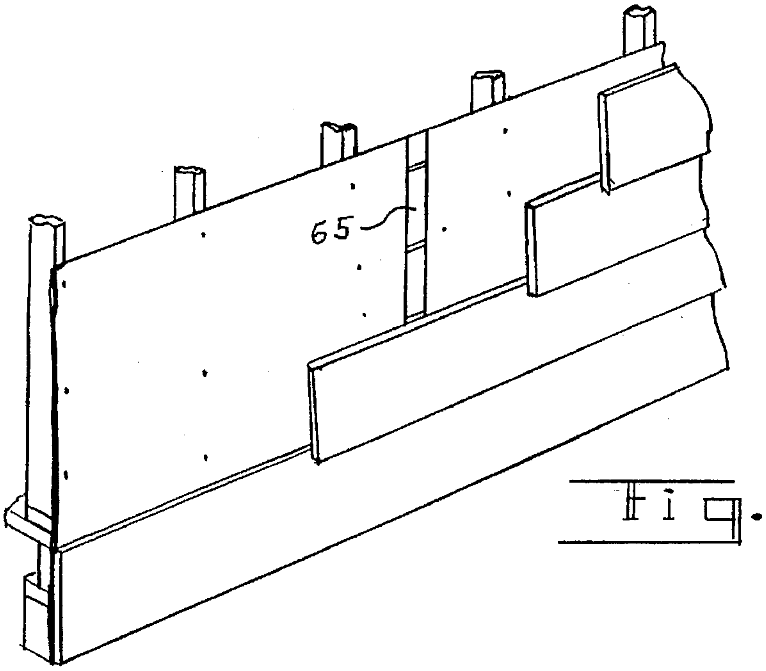
Fig. 6

49

SYSTEM AND METHOD FOR CONSTRUCTION GUIDANCE AND CONTROL

BACKGROUND OF THE INVENTION

1. Field of the Invention

The present invention relates generally to adhesively-backed disposable layout tapes used as aids in the construction of a building, and more particularly to a construction guidance and control system that generates such tapes that are customized and individualized for all the various and different subtasks involved in a construction project.

2. Description of the Prior Art

In the construction of buildings, or other static structures, it is vitally important that the structural members and components that comprise the completed structure be accurately positioned, measured and placed according to the construction plans and specifications. In the construction of buildings, commercial and residential, this includes the proper positioning and spacing, without significant error, of studding, beams, trusses, and metal and wooden members, as well as the framing of structural openings, such as doors, windows, stairwells, vents, etc. It is also important to obtain proper spacing and positioning of building side panels and roof shingles and panels, and between courses in masonry constructions, and the structural openings therein.

The conventional practice has long been for the individual fabricators and workers to use flexible measuring tapes of fabric or metal, to make manual measuring and marking operations necessary for proper positioning and spacing of various component members. This can be awkward and difficult when no assistance is available to a person. This can also require the assistance of another individual, and can be time-consuming, particularly in construction projects where a large number of measurements and markings must be made and where relatively large distances are involved. In some cases, measurement taking and marking requires stooping, reaching and climbing, and can expose a person to greater risk of injury. Because of this, significant, and cumulative marking errors can be introduced. Often the building industry employs relatively unskilled persons, and the likelihood of measurement errors are increased, particularly in view of the fact that measuring tapes generally involve fractional dimensions (fractions of an inch), and addition and subtraction calculations must be made. Thus, workers of greater skill and training, and thus higher pay, may be required to minimize this problem, although even skilled workers will invariably make measuring and marking mistakes. The foregoing can result in errors and improperly installed components, which require costly correction, reinstallation and rebuilding.

The above-mentioned drawbacks have prompted the development of a number of inventions which attempt to simplify and make more accurate measurement and marking operations in a construction environment. They have primarily been in the nature of layout tapes and templates. Thus, in U.S. Pat. No. 4,845,858, an adhesive-backed stud layout tape is disclosed for facilitating construction of building wall frames assemblies. The tape has colored indicia spaced apart in multiple series of equal and repeating intervals that represent on-center distances, such as 16 inch, 24 inch and 48 inch. Complementary tape sections can be attached respectively to the top and bottom plates of a wall frame so as to guide the accurate placement of studs between these plates.

U.S. Pat. No. 4,942,670 also takes into consideration certain common spacings between construction members, and discloses an adhesive tape upon which is printed equidistantly placed "fields" or zones to guide the locating and spacing of common construction members. The disposable construction layout tape shown in U.S. Pat. No. 5,012,590 is used in a similar manner and uses equidistantly placed indicia, whether it incorporates additional indicia that allows for placement of studs "on-center", "away" or "back" relative to a reference mark for stud locations. U.S. Pat. No. 5,107,601 shows equispaced sets of indicia printed on a pressure-sensitive adhesive tape to indicate hole patterns and locations, to indicate where holes are drilled in a surface for facilitating attachment of brackets to that surface, for example. Other examples of layout tapes are shown in U.S. Pat. Nos. 4,149,320 and 5,038,492.

While the foregoing examples may be well and good for their stated purposes, they all suffer in common from certain basic limitations. While they vary in the type of indicia used, and the sets of indicia used, they all rely on repeating series of equispaced indicia. They are essentially templates that indicate common spacing, and one must resort to building plans, specifications, and supervision in use of the tape. A fundamental limitation of all such prior tapes and templates is in the nature and extent of the information imparted to the user. They are essentially measuring devices and do not guide the user specifically in the assembly and fabrication work to be performed relative to the component part or structural member to which the tape is attached, as required for that location according to the given plans and specifications. Although, for example, prior construction layout tapes indicate common spacings for studs, and even can show a series of indicia for the spacing of king studs at a window location, there is no indication of specifically where along the taped member that the window studs are to be located, nor will such tapes give specific locations of other structural openings such as doors and stairwells, except by resort to the pertinent plans and specifications. They are also of limited application when nonstandard spacings are required. In all cases, it is required of the user, once the tape is in place, to choose which of the multiple indicia to use.

Over and beyond the above mentioned problems associated with conventional layout and template tapes is a general concern regarding conventional practices in the construction and other industries, whereby the work as originally specified by the architects and designers is not efficiently, effectively and reliably communicated to the ultimate executor of those plans, i.e., the fabricator, assembler, or constructor. There is currently no system, certainly no template or layout tape that provides a worker with all of the necessary information to allow him to perform appropriate construction tasks specifically according to the specifications and plans.

SUMMARY OF THE INVENTION

In view of the foregoing, it is a general object of the present invention to provide a method and that system includes customized tapes for guiding and directing the construction worker or fabricator in the performance of the specific fabrication tasks to be performed.

Another object of the invention is to provide minimally trained workers with the ability to perform fabrication tasks with minimal supervision.

Yet another object of the invention is to provide means by which the architects and designers of a physical entity to communicate construction and fabrication directions directly to the fabricator in a concise and easily understood manner.

Still another object is to provide a means for facilitating the worker in locating, spacing and aligning construction components.

A further object is to provide means by which an assembled structure can be quickly checked and inspected to verify completion of work and accuracy of that work.

These and other objects and advantages are achievable by the method and system of the present invention for guiding, controlling and directing the fabricator and assembler in the physical construction tasks including the locating, spacing and orientation of component structure required to complete a construction of a physical entity. The invention involves the creation and use of a plurality of elongate computer-generated and printed layout tapes, each tape being adhesive-backed and extendable longitudinally for adhesive attachment at preselected locations on component surfaces within the environment in which construction occurs. Directional marks show the direction of the front end of the tape, and coded printed labels identify and distinguish the tapes, one from the other, and indicate the order in which the tapes are to be arranged.

Each tape has printed thereon at preselected distances from the tape beginning, indicia that identifies and locates structural components relative to the structure upon which the tape is attached. Specific assembly instructions and material descriptions can also be printed on the tape.

The invention preferably includes at least one complementary information sheet to be used by the assembler in conjunction with the tapes, each sheet disclosing a view of the relevant portion of the entity to be constructed, and indicating in coded fashion where said tapes are to be attached within the particular construction environment, and how they are to be oriented. In a specific example, to be described, applied to the construction industry, the complementary information sheet includes a plan view on a letter size paper sheet.

The imprinting includes a series of transverse lines that are spaced apart from each other at predetermined distances commensurate with actual thicknesses of said structural components and actual distances between said components as called for by the relevant plans, the imprinting including text, between ones of said transverse lines, for identifying said components, and said display having a beginning and an end, and a predetermined length.

The invention involves the generation of these separately identifiable tapes in a series that reflects the desired sequential order of their use and application. Thus, the tapes are used in a logical sequence as the fabrication tasks described and directed by these tapes allow progression of the work to completion of an entire entity.

In another aspect, the invention incudes providing a supply roll of blank tape, a computer system with appropriate software, a keyboard, a monitor, and a printer and associated tape drive controlled by said computer for intermittently advancing the tape through the computer in a precise manner and imprinting the tape with indicia and data mentioned above, to form layout tapes. Preferably the tape drive is capable of advancing the tape in small increments, as small as 1/120", as required. The monitor displays the data entered the computer by means of the keyboard. The keyboard can be used in its conventional manner to enter the transverse lines, symbols and text comprising the imprinted matter of a layout tape. In a preferred embodiment of the invention, in order to enhance efficiency and accuracy, and to avoid excessive typing, the keyboard keys are programmable and can be reconfigured or redefined to perform various functions such as displaying on the monitor certain pre-established, pre-set group data files. Group data associated with a particular programmed key can include the printing of plural transverse lines and text for identifying and spacing plural structural components. A suitable template or keyboard guide is provided to guide the data entry person (the layout tape author) as to the group data to be entered with each reconfigured key. A plurality of various file groups can be arranged in a menu, and an appropriate keyboard guide is provided for each such grouping.

It will be seen that the present invention will be described with reference to its example of use in the building construction industry for the construction of a building, however the breadth and scope of the invention is not to be limited thereto. Those skilled in the art will readily appreciate the principles of the invention as will be revealed in the example to follow, can be advantageously applied to a number of other fabrication and construction processes, and such applications are to be considered within the scope and breadth of the invention.

BRIEF DESCRIPTION OF THE DRAWINGS

FIG. 2 is an enlarged illustration of a blank supply tape according to the invention;

FIG. 6 is another partial perspective view showing the use of a layout tape according to the invention; and FIG. 7 illustrates a typical plan view of a complementary information sheet according to the invention.

DETAILED DESCRIPTION OF THE INVENTION

Figure 1:
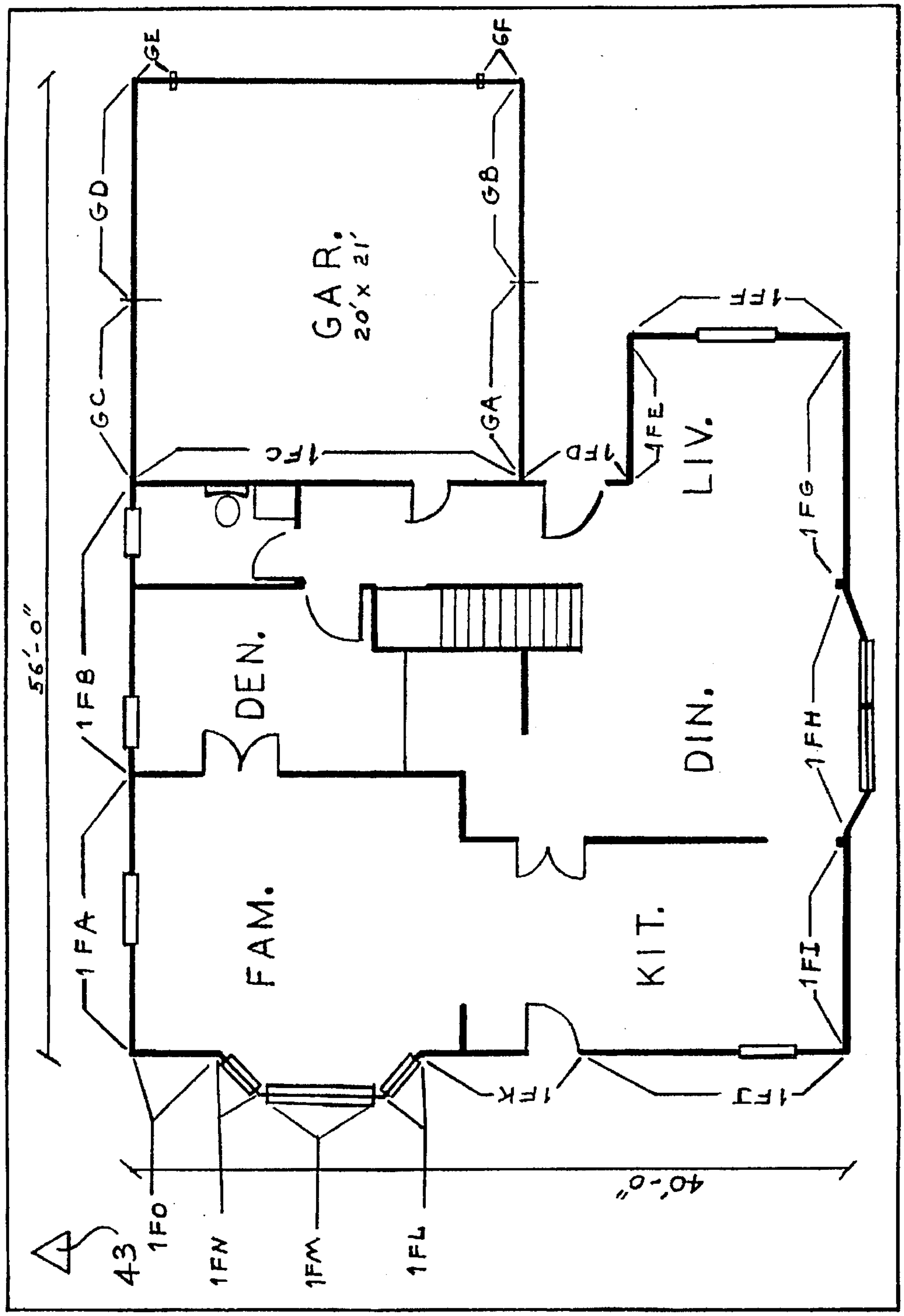
FIG. 1 is a block diagram of tape-generating apparatus in accordance with the invention.

Referring now to the drawings, FIG. 1 illustrates generally by reference numeral 11 equipment suitable for producing construction guidance control and layout tapes according to the present invention, wherein there is a tape drive mechanism 15 that feeds blank tape 17 off a supply roll 19 through a printer 21. The CPU of a computer 23 controls the printer and tape drive, and a keyboard 25 that has programmable keys 27, and a monitor 29 are connected to the computer 23.

The invention will be illustrated by way of an example of its application to the construction of a building. Since a multitude of layout tapes, each in the range of about 8' to 20' are required in such applications, it is preferred that supply roll 19 be about 1250' long, and rotatably supported in a manner that offers a minimum of resistance to rotation about its axis.

A suitable printer 21 includes a model Epson LQ-570+ that has a print head (not shown) for moving transversely with respect to the supplied tape 17 and printing on the tape 17 as it is intermittently fed past the print head.

The tape drive mechanism 15 has drive sprocket means 31 for engaging peripheral holes of the supplied tape, to be described, in a manner that ensures the advancement of the tape through and from the printer 21 in a manner that is definite and precise. It should be capable of making incremental advancements as small as 1/120".

FIG. 2 shows that the supply or stock tape 17 which preferably has a total width of 3", has longitudinally extending perforations 33 which will allow a printed layout tape to be separated into two matching segments when used in particular applications on opposing parallel structures, to be described. Tape 17 features a main portion 35 that is comprised of low-stretch paper material that has facing surface 37 suitable for being printed upon, and an opposite surface (not shown) that is coated with a conventional pressure-sensitive adhesive.

Finally supply tape 17 is seen to include a peel-off backing 39 that has peripheral margins containing holes 41 designed to be engaged by pins of the drive sprockets 31 of the tape drive mechanism 15.

In the construction of a building, residential or industrial, layout tapes can be used to control and direct the building of the entire structure from "ground up," i.e., from basement to roof. It is intended here to sufficiently disclose the principles and operation of the invention by illustrating how it is used in the layout and assembly of the wall framing for the first floor of a residential building, shown in FIG. 7 and partly in FIG. 5.

In advance of creating the first floor layout tapes, it is preferred to provide, as FIG. 7 shows, a complementary information sheet 41, i.e., a handy 8½"×11" sheet that gives a plan view of the first floor. Information sheet 41 will be eventually used by the assembler, in conjunction with layout tapes, and shows locations of vertical framing members, the overall lengths of walls, which walls have the framing corners, and measurements from the beginning of an entire wall to the beginning of an outside corner. Here it is convenient to break down the first floor walls into separate sections of 16' or less, using 16' sections as much as possible, and preferably allowing that each section contains a complete header, and the trimmers, and the king studs on each end of the header. It is along these wall sections that layout tapes will be applied, and these sections will be each identified and tagged on the sheet 41 by a code comprising a floor designation followed by an alphabetical letter. For example, "1FA" which means first floor, section "A." The alphabetical order of the assigned letters indicate the sequence in which it is desired to assemble the various wall sections, and show how layout tapes will be arranged in end-to-end relationship around the first floor. The complementary information sheet 41 will show a reference marker, such a shown by reference numeral 43. The layout tapes will each have a front and rear end, and the marker 43 will ensure proper alignment of the layout tapes by indicating the general direction in which the tapes are to be pointed.

After the information sheet 41 is created, all of the wall framing layout tapes for the first floor, beginning with tape 1FA, with the assistance of sheet 41, can be made.

Information to be printed on tape surface 37, including transverse lines, symbols and text, can be displayed on monitor 29 and stored in computer 23 by using the keys of keyboard 25 in the conventional manner. To increase accuracy and speed, and to minimize typing, a computer program, to be disclosed, allows the programming of keys 23 such that certain pre-set groups of data can be input with a single stroke of a particular key. Thus group data files of certain frame members and spacings commonly employed in wall systems can be created. For example, a group of files pertinent to the construction of wall frames with 16' stud centers can be created and compiled, and each group data file will be associated with a particular programmed key 23. For example, a a menu would include pre-set data for "Wall Frames with Studs on 16" Centers" and be named accordingly on the menu.

Figure 3:
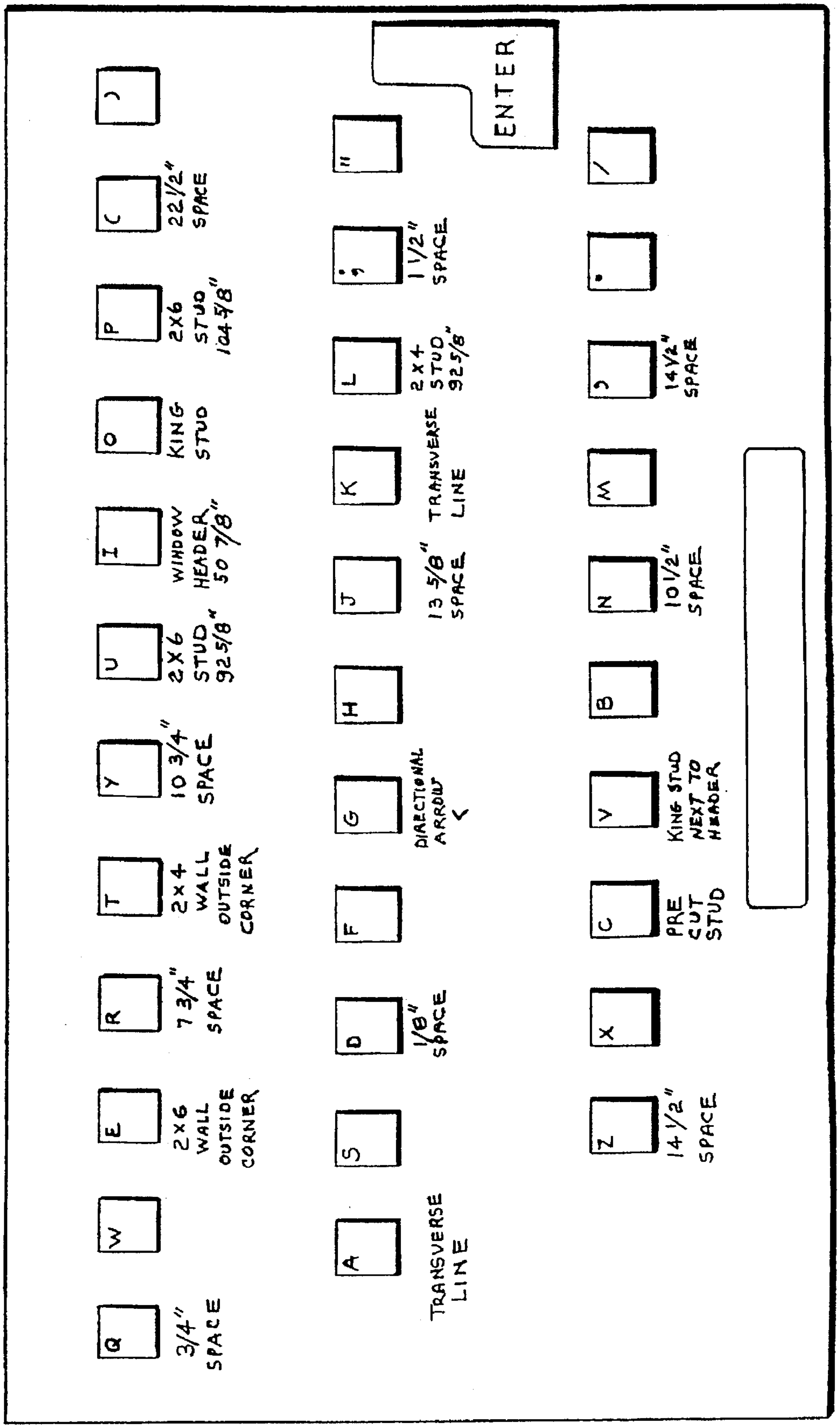
FIG. 3 is an illustration of a keyboard template or guide, showing key functions of the reconfigured programmable keys.
Figure 4:
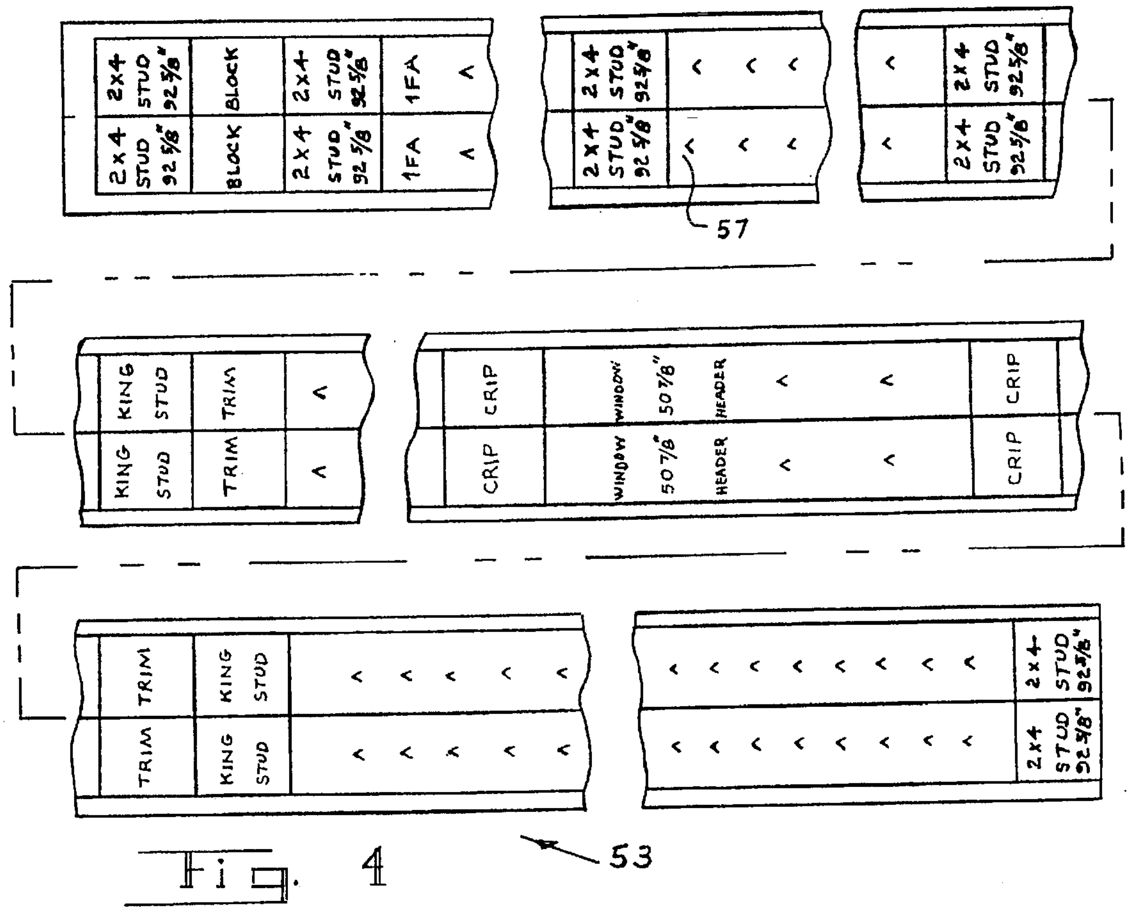
FIG. 4 is an example of a layout tape composed according to the present invention.

Keyboard guides are required to guide the creator of layout tapes in the use of the programmed keys 23. FIG. 3 shows a keyboard guide 49 for keys programmed for "Wall Frames with Studs on 16" Centers," whereby various preselected data including transverse lines and/or textual data are assigned to the various keys. The dimensions, including lengths of structural members are also included. Thus guide 49 shows that the "K" key is programmed to print a transverse line, the "L" key will print a pair of transverse lines 1½" apart, and will type the text "2×4 STUD" and "92⅝"" between the lines, and the "J" key will dictate a spacing of 13⅝" from a previously entered transverse line. The printing of multiple directional arrows 57 accompanies the spacing operation. The directional arrows 57 show the beginning end of tape 53. With the keyboard 25 appropriately programmed, and with the assistance of the information sheet 41, the layout tapes for first floor wall framing can be created. Accordingly, the layout tape 53 shown in FIG. 4 is created. Since tape 53 will be applied to the wall section tagged as "1FA" on the information sheet, it will be identified by the print "1FA TAPE." Both sides of the perforating line 33 will be identically printed, thereby providing two identical tapes, one for the bottom plate and the other for the parallel upper plate between which plates studs are to be located.

Preferably the computer program allows a display on monitor 29 of a running total of distances of entered structural components from the beginning of an entire wall (as opposed to a wall section), to help verify accurate location of structural components.

Figure 5:
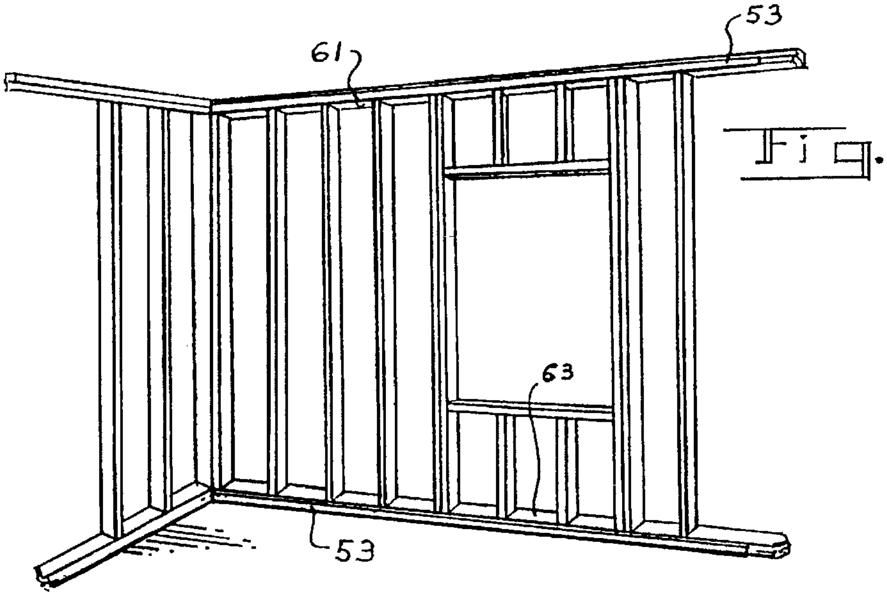
FIG. 5 is a partial perspective view of a residential building, illustrating application of layout tapes according to the invention.

In the above-described manner, all of the layout tapes for the wall sections identified on the first floor information sheet 41, shown in FIG. 5 can be created. The length, about 1250', of the supply roll 17, will allow the printing of a single length of multiple contiguous layout tapes, and individual layout tapes will be later cut from the larger roll when required. In our specific example, the assemblers of the first floor walls will locate, orient and adhesively attach the first floor layout tapes to the appropriate surfaces on the first floor wall sections, with the aid of information sheets 41. FIG. 5 illustrates the application of the layout tape 53 to surfaces of top and bottom plates 61 and 63. The assemblers can then locate and affix the studs and other vertical members to the horizontally extending structure according to the attached layout tapes.

Similarly, layout tapes can be created to cover the second floor wall framing. Moreover, layout tapes can be produced for the other and various structural systems and subsystems comprising the entire building structure. Thus tapes can be produced for the layout of floor and ceiling joists, and roof framing, for example. Note that software used with the invention will count the various structural members used, as their quantities and dimensions are input to the computer, e.g., the 2×4 studs, 2×6 studs, and the cripples and their lengths. The horizontal top and bottom plates, which have lengths proportional to the lengths of the layout tapes, can also be counted. Thus a materials list can be compiled.

Layout tapes according to the invention can also be provided for application not only along horizontal structures, but in other directions as well, such as the vertical direction as illustrated in FIG. 6 wherein a layout tape 65 guides the alignment and installation of the various courses of siding material.

In order to complete this invention disclosure, printouts of the pertinent computer program listings are attached, and are a part of the specification. The program routines and subroutines for the creation of layout tapes according to the invention are given in sufficient detail to enable those skilled in the art to carry it out. The program can be used in a number of conventional commercially available computers.

While the invention has been particularly shown and described with reference to certain preferred embodiments, it will be understood by those skilled in the art that various modifications in form and details may be made therein without departing from the spirit and scope of the invention as disclosed and defined in the claims which follow.

PRO2.FOR Wednesday, November 16, 1994 12:50 pm

```
C      ============================================================
C      LEE CARLSON AND RICH MCCLURE
C      (C) "YOUR SET" 1994, PATENT PENDING
C      ============================================================
C      MAIN PROGRAM "ENGINE" FOR GENERATING TAPES
C      ============================================================
       IMPLICIT NONE

C      DEFINE THE ARRAY THAT DEFINE OBJECTS
       CHARACTER *15 OBJECT(50,15)
       CHARACTER *15 CMDS(15)
       CHARACTER *50 INFIL, OTFIL
       CHARACTER *100 LINE
       INTEGER INP, OUT, NUMCMD, N
       LOGICAL ISOBJ
       DATA INP,OUT/1,2/

C      SET THE INPUT AND OUTPUT FILE FOR TESTING ONLY!!!
       INFIL = 'TEST2.INP'
       OTFIL = 'PRO2.OUT'

C      OPEN THE INPUT AND OUTPUT FILES
       OPEN(INP,FILE=INFIL,STATUS='OLD')
       OPEN(OUT,FILE=OTFIL,STATUS='UNKNOWN')

C      FILL THE OBJECT ARRAY
       CALL LDOBJ(OBJECT)

C      READ THE LINES FROM THE INPUT FILE UNTIL WE GET TO THE END OF FILE
10     READ(INP,'(A)',END=999) LINE

C         IF THIS IS A BLANK LINE THEN SKIP IT
          N = LEN_TRIM(LINE)
          IF (N .LE. 0) GOTO 10

C         PARSE THE LINE INTO IT'S COMPONENTS
          CALL PRSLIN(LINE,CMDS,NUMCMD)

C         IS THIS THE "BEGIN" OR "END" COMMAND
          N = LEN_TRIM(CMDS(1))
          IF ( (CMDS(1)(1:N)) .EQ. 'END') THEN
             CALL OUTLIN(OUT,'__________',0.0,10)
             GOTO 999
          ENDIF
          IF ( (CMDS(1) 1:N)) .EQ. 'BEGIN') THEN
             CALL OUTLIN(OUT,'__________',0.0,10)
             GOTO 10
          ENDIF
```

PRO2.FOR Wednesday, November 16, 1994 12:50 pm

```
C         LOOK UP STANDARD OBJECTS AND FIND THEIR PROPERTIES
          CALL EXPOBJ(OBJECT,CMDS,ISOBJ)

C         WRITE A STANDARD ITEM WITH THE EXPLODED TEXT TO THE OUTPUT FILE
          IF (ISOBJ) THEN
             CALL WRTOBJ(OUT,CMDS)
          ENDIF

C         WRITE A BLANK SPACE
          IF (CMDS(1)(1:N) .EQ. 'BLANK') CALL WRTBLK(OUT,CMDS)

C         READ ANOTHER LINE FROM THE INPUT FILE
          GOTO 10

C      CLOSE THE INPUT AND OUTPUT FILES
999    CLOSE(INP)
       CLOSE(OUT)

       STOP
       END
```

```
LDOBJ.FOR            Wednesday, November 16, 1994 12:50 pm

C     ============================================================
C     LEE CARLSON AND RICH MCCLURE
C     (C) "YOUR SET" 1994, PATENT PENDING
C     ============================================================
C     SUBROUTINE TO LOAD OBJECT INFORMATION FROM DISK
C     ============================================================

      SUBROUTINE LDOBJ(OBJECT)
      IMPLICIT NONE
      CHARACTER *15 OBJECT(50,15)
      CHARACTER *200 LINE
      INTEGER UNIT,I, J, K, N, L

C     INITIALIZE THE OBJECT ARRAY
C     ============================================================
      OBJECT = ' '
      UNIT = 10

C     OPEN THE OBJECT DATA FILE
C     ============================================================
      OPEN(UNIT,FILE='OBJECT.DAT',RECL=200,STATUS='OLD')
      CALL SKPLIN(UNIT,5)

      DO I = 1, 50

C        READ A LINE AND DETERINE HOW LONG IT IS
C        =========================================================
         J = 1
         L = 1
         READ(UNIT,'(A)',END=20) LINE
         N = LEN_TRIM(LINE)

C        NOW PARSE THIS LINE INTO OBJECTS SEPERATED BY COMMAS
C        =========================================================
         DO K = 1, N
            IF (LINE(K:K) .EQ. CHAR(44)) THEN
               J = J + 1
               L = 1
               IF (J .GT. 15) GOTO 10
            ELSE
               OBJECT(I,J)(L:L) = LINE(K:K)
               L = L + 1
            ENDIF
         ENDDO
10       CONTINUE
      ENDDO

20    CLOSE(UNIT)
```

```
LDOBJ.FOR            Wednesday, November 16, 1994 12:50 pm

C       RETURN TO THE MAIN CALLING PROGRAM
C       ==============================================================
        RETURN
        END
```

```
OUTLIN.FOR            Wednesday, November 16, 1994 12:50 pm

C      ==============================================================
C      LEE CARLSON AND RICH MCCLURE
C      (C) "YOUR SET" 1994, PATENT PENDING
C      ==============================================================
C      SUBROUTINE TO OUTPUT INFORMATION
C      ==============================================================

       SUBROUTINE OUTLIN(UNIT,STR,DIST,SIZE)
       IMPLICIT NONE

       CHARACTER *(*) STR
       CHARACTER *17  OUTSTR, TMPSTR
       REAL *4 DIST
       INTEGER UNIT, SIZE, IMOVE, N, N1

C      DETERMINE THE SPACING
C      ==============================================================
       IMOVE = MAX(1,INT(DIST*180))

       OUTSTR = ' '
       N1 = MAX(1,LEN_TRIM(STR))
       TMPSTR = STR(1:MIN(N1,SIZE))
       N = INT((SIZE-LEN_TRIM(TMPSTR))/2.)
       OUTSTR(N+1:) = STR(1:N1)

       WRITE(UNIT,12) OUTSTR(1:SIZE),OUTSTR(1:SIZE),CHAR(27),CHAR(51),
      &   CHAR(IMOVE)
12        FORMAT(5A)

C      RETURN TO THE MAIN CALLING PROGRAM
C      ==============================================================
       RETURN
       END
```

WRTBLK.FOR Wednesday, November 16, 1994 12:50 pm

```
C      ==============================================================
C      LEE CARLSON AND RICH MCCLURE
C      (C) "YOUR SET" 1994, PATENT PENDING
C      ==============================================================
C      SUBROUTINE TO WRITE OUT BLANK SPACES
C      ==============================================================

       SUBROUTINE WRTBLK(UNIT,CMDS)
       IMPLICIT NONE
       INTEGER UNIT, SYMLEN, TXTPOS, N, I
       CHARACTER *15 SYMBOL
       CHARACTER *15 CMDS(15)
       REAL *4 MAXLEN, TOTLEN, INC
       LOGICAL FIRST, DOSYM, DOTXT

C      ZERO THE TOTAL LENGTH FOR EACH BLANK SPACE
C      ==============================================================
       TOTLEN = 0.
       FIRST = .TRUE.

C      CHECK TO SEE IF A SYMBOL IS REQUIRED FOR THIS BLANK SPACE
C      ============================== ===============================
       IF (LEN_TRIM(CMDS(3)) .GT. 0) THEN
          DOSYM = .TRUE.
          SYMLEN = LEN_TRIM(CMDS(3))
          SYMBOL = CMDS(3)(1:SYMLEN)
       ELSE
          DOSYM = .FALSE.
          SYMLEN = 1.
          SYMBOL = ' '
       ENDIF


C      DETERMINE WHAT THE MAXLENGTH OF THE SPACE IS IN INCHES
C      ==============================================================
       READ(CMDS(4),'(F10.0)') MAXLEN

C      IS THERE ANY TEXT REQUIRED
C      ==============================================================
       IF ((LEN_TRIM(CMDS(6)) .GT. 0) .AND. (MAXLEN .GT. 1.0) ) THEN
          DOTXT = .TRUE.
       ELSE
          DOTXT = .FALSE.
       ENDIF

C      IF THERE IS TEXT, THEN HOW IS IT POSITIONED IN THE SPACE
C      ==============================================================
       TXTPOS = 0
       IF ( DOTXT ) THEN
```

WRTBLK.FOR Wednesday, November 16, 1994 12:50 pm

```
         N = LEN_TRIM(CMDS(5))
         IF (CMDS(5)(1:N) .EQ. 'BEGIN')  TXTPOS = 1
         IF (CMDS(5)(1:N) .EQ. 'CENTER') TXTPOS = 2
         IF (CMDS(5)(1:N) .EQ. 'END')    TXTPOS = 3
      ENDIF

C     IF IT IS A SIMPLE BLANK SPACE, I.E. NO TEXT, RETURN WHEN DONE
C     ==============================================================
      IF (.NOT. DOTXT) THEN
10       INC = MIN(1.25,(MAXLEN-TOTLEN))
         TOTLEN = TOTLEN + INC
         IF (FIRST) THEN
            CALL OUTLIN(UNIT,'__________',INC,10)
            FIRST = .FALSE.
         ELSE
            CALL OUTLIN(UNIT,SYMBOL,INC,10)
         ENDIF
         IF (TOTLEN .LT. MAXLEN) GOTO 10
         RETURN
      ENDIF

C     POSITION THE TEXT CORRECTLY IN THE SPACE PROVIDED
C     ==============================================================
      IF (TXTPOS .EQ. 1) THEN

C        TEXT IS PLACED AT THE BEGINNING OF THE BLANK SEGMENT
C        ===========================================================
         INC = .25
         CALL OUTLIN(UNIT,'__________',INC,10)
         DO I = 6, 15
            IF (LEN_TRIM(CMDS(I)) .GT. 0) THEN
               CALL OUTLIN(UNIT,CMDS(I),INC,10)
               TOTLEN = TOTLEN + INC
            ENDIF
         ENDDO
         TOTLEN = TOTLEN + INC

20       INC = MIN(1.25,(MAXLEN-TOTLEN))
         TOTLEN = TOTLEN + INC
         CALL OUTLIN(UNIT,SYMBOL,INC,10)
         IF (TOTLEN .LT. MAXLEN) GOTO 20
         RETURN


      ELSEIF (TXTPOS .EQ. 2) THEN
C        TEXT IS CENTERED IN THE OPENING
C        HOW MUCH TEXT IS THERE?
C        ===========================================================
         INC = .25
```

```
WRTBLK.FOR             Wednesday, November 16, 1994 12:50 pm

         FIRST = .TRUE.
         DO I = 6, 15
            IF (LEN_TRIM(CMDS(I)) .GT. 0) THEN
               TOTLEN = TOTLEN + INC
            ENDIF
         ENDDO
         TOTLEN = TOTLEN - .25
C        CALCULATE THE CENTER OF THE TEXT
C        ===========================================================
         MAXLEN = ( MAXLEN - TOTLEN ) / 2.0

C        FILL WITH SYMBOLS UNTIL THE CENTER
C        ===========================================================
30       INC = MIN(1.25 (MAXLEN-TOTLEN))
         TOTLEN = TOTLEN + INC
         IF (FIRST) THEN
            CALL OUTLIN(UNIT,'__________',INC,10)
            FIRST = .FALSE.
         ELSE
            CALL OUTLIN(UNIT,SYMBOL,INC,10)
         ENDIF
         IF (TOTLEN .LT. MAXLEN) GOTO 30

C        WRITE THE TEXT IN THE CENTER
C        ===========================================================
         INC = .25
         DO I = 6, 15
            IF (LEN_TRIM(CMDS(I)) .GT. 0) THEN
               CALL OUTLIN(UNIT,CMDS(I),INC,10)
            ENDIF
         ENDDO

C        FINISH THE SYMBOLS UNTIL THE END
C        ===========================================================
         TOTLEN = 0.
35       INC = MIN(1.25,(MAXLEN-TOTLEN))
         TOTLEN = TOTLEN + INC
         CALL OUTLIN(UNIT,SYMBOL,INC,10)
         IF (TOTLEN .LT. MAXLEN) GOTO 35
         RETURN


      ELSEIF (TXTPOS .EQ. 3) THEN
C        TEXT IS PLACED AT THE END OF THE BLANK SEGMENT
C        ===========================================================
         INC = .25
         FIRST = .TRUE.
         DO I = 6, 15
            IF (LEN_TRIM(CMDS(I)) .GT. 0) THEN
```

```
WRTBLK.FOR              Wednesday, November 16, 1994 12:50 pm

                MAXLEN = MAXLEN - INC
             ENDIF
          ENDDO
40        INC = MIN(1.25,(MAXLEN-TOTLEN))
          TOTLEN = TOTLEN + INC
          IF (FIRST) THEN
             CALL OUTLIN(UNIT,'__________',INC,10)
             FIRST = .FALSE.
          ELSE
             CALL OUTLIN(UNIT,SYMBOL,INC,10)
          ENDIF
          IF (TOTLEN .LT. MAXLEN) GOTO 40
          INC = .25
          DO I = 6, 15
             IF (LEN_TRIM(CMDS(I)) .GT. 0) THEN
                CALL OUTLIN(UNIT,CMDS(I),INC,10)
             ENDIF
          ENDDO
          RETURN

       ENDIF

       END
```

SETFNT.FOR Wednesday, November 16, 1994 12:50 pm

```
C      ==============================================================
C      LEE CARLSON AND RICH MCCLURE
C      (C) "YOUR SET" 1994, PATENT PENDING
C      ==============================================================
C      SUBROUTINE TO CHANGE THE FONT
C      ==============================================================

       SUBROUTINE SETFNT(UNIT,SIZE)
       IMPLICIT NONE
       INTEGER UNIT, SIZE

       IF(SIZE .EQ. 10) WRITE(UNIT,'(A,\)') CHAR(27)//CHAR(33)//CHAR(0)
       IF(SIZE .EQ. 12) WRITE(UNIT,'(A,\)') CHAR(27)//CHAR(33)//CHAR(1)
       IF(SIZE .EQ. 17) WRITE(UNIT,'(A,\)') CHAR(27)//CHAR(33)//CHAR(4)

C      RETURN TO THE MAIN CALLING PROGRAM
C      ==============================================================
       RETURN
       END
```

WRTOBJ.FOR Wednesday, November 16, 1994 12:50 pm

```
C     ==============================================================
C     LEE CARLSON AND RICH MCCLURE
C     (C) "YOUR SET" 1994, PATENT PENDING
C     ==============================================================
C     SUBROUTINE TO OUTPUT A STANDARD OBJECT WITH THREE LINES OF TXT
C     ==============================================================

      SUBROUTINE WRTOBJ(UNIT,CMDS)
      IMPLICIT NONE
      INTEGER UNIT, LABELS, N, I, ISIZE
      REAL *4 WIDTH, SPACING, MINSPAC, TOTLEN, INC, SIZE
      CHARACTER *15 CMDS(15)
      LOGICAL DOSYM

C     SET THE MINIMUM SPACING TO BE 1/6 OF AN INCH
C     ==============================================================
      MINSPAC = 1. / 6.

C     EXTRACT THE WIDTH FROM THE COMMANDS
C     ==============================================================
      READ(CMDS(4)(1:10),'(F10.0)') WIDTH

C     DETERMINE THE LENGTH OF A SYMBOL
C     ==============================================================
      N = LEN_TRIM(CMDS(3))
      IF (N .GT. 0) THEN
         DOSYM = .TRUE.
      ELSE
         DOSYM = .FALSE.
      ENDIF

C     DETERMINE HOW MANY LINE OF TEXT THERE ARE
C     ==============================================================
      LABELS = 0
      DO I = 6, 15
         IF (LEN_TRIM(CMDS(I)) .GT. 0) LABELS = LABELS + 1
      ENDDO

C     IF A SYMBOL IS REQUIRED THEN PLACE ONE AT THE BEGINNING & END
C     ==============================================================
      IF (DOSYM) THEN

         IF (LABELS .EQ. 10) GOTO 100

         IF (LABELS .EQ. 9) THEN
            CMDS(15) = CMDS(3)
            LABELS = 10
            GOTO 100
         ENDIF
```

WRTOBJ.FOR Wednesday, November 16, 1994 12:50 pm

```
         CMDS(LABELS+7) = CMDS(3)
         DO I = LABELS, 1, -1
            CMDS(I+6) = CMDS(I+5)
         ENDDO
         CMDS(6) = CMDS(3)
         LABELS = LABELS + 2

      ENDIF

C     FIGURE OUT THE LINE SPACING
C     ==============================================================
100   IF (LABELS .EQ. 0) THEN
         SPACING = WIDTH
         TOTLEN = 0.
40       INC = MIN(1.25,(WIDTH-TOTLEN))
         TOTLEN = TOTLEN + INC
         CALL OUTLIN(UNIT," ",INC,10)
         IF (TOTLEN .LT. WIDTH) GOTO 40
         RETURN
      ELSE
         SPACING = WIDTH / (LABELS + 1.)
      ENDIF

C     DRAW THE FIRST LINE
C     ==============================================================
      CALL OUTLIN(UNIT,'__________',SPACING,10)

C     SET THE FONT
C     ==============================================================
      READ(CMDS(2)(1:10),'(F10.0)') SIZE
      ISIZE = INT(SIZE)
      IF (ISIZE .GT. 10) CALL SETFNT(UNIT,ISIZE)

C     WRITE THE REST OF THE TEXT
C     ==============================================================
      DO I = 1, LABELS
         CALL OUTLIN(UNIT,CMDS(I+5),SPACING,ISIZE)
      ENDDO

C     RESET THE FONT IF NECESSARY
C     ==============================================================
      IF (ISIZE .GT. 10) CALL SETFNT(UNIT,10)

C     RETURN TO THE MAIN CALLING PROGRAM
C     ==============================================================
      RETURN
      END
```

```
CHRCHK.FOR              Wednesday, November 16, 1994 12:50 pm

C       ===========================================================
C       LEE CARLSON AND RICH MCCLURE
C       (C) "YOUR SET" 1994, PATENT PENDING
C       ===========================================================
C       FUNCTION TO CHECK TO SEE IF A CHARACTER IS PART OF ANOTHER STRING
C       ===========================================================

        LOGICAL FUNCTION CHRCHK(CHAR1)
        IMPLICIT NONE
        CHARACTER *1 CHAR1
        CHARACTER *10 PRSCHRS

        PRSCHRS = ','

        IF (INDEX(PRSCHRS,CHAR1(1:1)) .GT. 0) THEN
           CHRCHK = .TRUE.
        ELSE
           CHRCHK = .FALSE.
        ENDIF

C       RETURN TO MAIN MENU
C       ===========================================================
        RETURN
        END
```

```
REVERS.FOR             Wednesday, November 16, 1994 12:50 pm

C      ============================================================
C      LEE CARLSON AND RICH MCCLURE
C      (C) "YOUR SET" 1994, PATENT PENDING
C      ============================================================
C      SUBROUTINE TO REVERSE A LOGICAL VARIABLE
C      ============================================================

       SUBROUTINE REVERSE(TEMP)
       IMPLICIT NONE
       LOGICAL TEMP

       IF (TEMP) THEN
          TEMP = .FALSE.
       ELSE
          TEMP = .TRUE.
       ENDIF

C      RETURN TO THE MAIN CALLING PROGRAM
C      ============================================================
       RETURN
       END
```

PRSLIN.FOR Wednesday, November 16, 1994 12:50 pm

```
C      ==============================================================
C      LEE CARLSON AND RICH MCCLURE
C      (C) "YOUR SET" 1994, PATENT PENDING
C      ==============================================================
C      SUBROUTINE TO PARSE A INTERMEDIATE LINE INTO IT'S COMPONENTS
C      ==============================================================

       SUBROUTINE PRSLIN(LINE,CMDS,NUMCMD)
       CHARACTER *15 CMDS(15)
       CHARACTER *(*) LINE
       INTEGER NUMCMD, MAXCHR
       LOGICAL CHRCHK, STRING, INFO

C      INITIALIZE ALL VARIABLES
C      ==============================================================
       CMDS = ' '
       NUMCMD = 1
       MAXCHR = LEN_TRIM(LINE)
       STRING = .FALSE.
       INFO = .FALSE.
       J = 1

C      PROCESS EACH CHARACTER IN THE LINE
C      ==============================================================
       DO I = 1, MAXCHR

C         IF THIS CHARACTER AND IT IS NOT IN A STRING THEN IGNORE IT
C         ==========================================================
          IF (LINE(I:I) .EQ. CHAR(32) .AND. .NOT. STRING) GOTO 100
          IF (LINE(I:I) .EQ. CHAR(32) .AND. STRING) GOTO 90

C         IF THIS CHARACTER IS A COMMA THEN INCREMENT THE ARRAY COUNTER
C         ==========================================================
          IF (CHRCHK(LINE(I:I))) THEN
             NUMCMD = NUMCMD + 1
             J = 1
             GOTO 100
          ENDIF

C         IF THIS CHARACTER IS A QUOTE THEN IT EITHER STARTS OR ENDS A STRIN
G
C         ==========================================================
          IF (LINE(I:I) .EQ. CHAR(34)) THEN
             CALL REVERSE(STRING)
             GOTO 100
          ENDIF

90        CMDS(NUMCMD)(J:J) = LINE(I:I)
          J = J + 1
```

PRSLIN.FOR Wednesday, November 16, 1994 12:50 pm

```
100     CONTINUE
      ENDDO

C     RETURN TO THE MAIN CALLING PROGRAM
C     ==============================================================
      RETURN
      END
```

EXPOBJ.FOR Wednesday, November 16, 1994 12:50 pm

```
C      ==============================================================
C      LEE CARLSON AND RICH MCCLURE
C      (C) "YOUR SET" 1994, PATENT PENDING
C      ==============================================================
C      SUBROUTINE TO EXPLODE AN OBJECT INTO IT'S COMPONENTS
C      ==============================================================

       SUBROUTINE EXPOBJ(OBJECT,CMDS,ISOBJ)
       IMPLICIT NONE
       CHARACTER *15 OBJECT(50,15), CMDS(15), NAME
       INTEGER I, N, J
       LOGICAL ISOBJ

C      INITIALIZE LOCAL VARIABLES
       ISOBJ = .FALSE.

       NAME = CMDS(1)
       N = LEN_TRIM(NAME)

C      LOOK FOR THE OBJECT NAME IN THE ARRAY OF VALID OBJECTS
C      ==============================================================
       DO I = 1, 50
          IF (NAME(1:N) .EQ. OBJECT(I,1)(1:N) ) GOTO 200
          IF (OBJECT(I,1) .EQ. ' ') GOTO 100
       ENDDO

C      IF NOT FOUND THEN RETURN TO MAIN PROGRAM
C      ==============================================================
100    RETURN

C      IF FOUND THEN FILL CMDS ARRAY USING NON BLANKS AS DEFAULTS
C      ==============================================================
200    DO J = 2, 15
          IF (CMDS(J) .EQ. ' ') CMDS(J) = OBJECT(I,J)
       ENDDO

C      SET THE OBJECT FILE TO TRUE TO
C      ==============================================================
       ISOBJ = .TRUE.

C      RETURN TO THE MAIN CALLING PROGRAM
C      ==============================================================
       RETURN
       END
```

What is claimed is:

1. A method for guiding, controlling and directing the construction of a useful physical entity according to plans and specifications for said entity, said entity including a plurality of components located and oriented with respect to each other and at least one reference structure having a longitudinally extending surface, said method including the steps of:

a) providing a programmable computer, data entry means and monitor connected to said computer, a supply roll of elongate adhesively-backed tape, and printer and tape drive means, controlled by said computer, for advancing said tape through said printer and printing on said tape;

b) using said data entry means to input to said computer information from said plans and specifications regarding the description of said components and their orientation and location relative to the longitudinally extending surface of said reference structure;

c) using said computer, and printer and tape drive means to print out said input information along the length of an elongate section of said tape, said printed information including text and spaced-apart transverse lines to identify said components, beginning end of sad tape and to show locations of said components and their spacing and orientation relative to each other said beginning end and the longitudinally extending surface of said reference structure, and said printed tape comprising a layout tape; and d) attaching said layout tape along said surface of said reference structure, and locating and assembling said components to said reference structure according to the information on said layout tape.

2. A method as defined in claim 1 wherein said entity includes a plurality of sets of said reference structure and plural components, and including the step of providing a plurality of said layout tapes, one said layout tape for each of said sets.

3. A method as defined in claim 2 including identifying said layout tapes individually and with a sequential alphanumeric code that indicates where in said physical entity said tape is to be attached and applying said plural layout tapes to said structure in end-to-end relationship and in a sequence according to said code.

4. A method as defined in claim 1 wherein said reference structure comprises an elongate member, and said components including spaced-apart parallel members that extend from said elongate member.

5. A method as defined in claim 4 wherein said tape indicia locates said parallel members relative to said tape beginning end and each other, and wherein said indicia identifies the length of said parallel members.

6. A method as defined in claim 1 wherein said data entry means comprise a keyboard with programmable keys, and including the steps of programming said keys whereby individual ones of said keys will print certain predetermined group data files, said files including textual data and transverse lines that describe said components and locate said components along said layout tape.

7. A method as defined in claim 1 including providing a complementary information sheet for use with said layout tape, said sheet including a view of at least a portion of said entity containing said reference structure, and identifying where said layout tape is to be attached and how it is to be aligned.

8. A method as defined in claim 1 wherein said computer tallies said components and said at least one reference structure to produce a materials list thereof.

* * * * *